3,354,199
PRODUCTION OF ETHYL ACRYLATE
Stefan Kazimierz Lachowicz, Tunbridge Wells, Kent, Christopher John Brown, Walton-on-the-Hill, Tadworth, Surrey, Bertram Ernest Victor Bowen, Southborough, near Tunbridge Wells, Kent, and Frank Christopher Newman, Great Bookham, Surrey, England, assignors to The Distillers Company Limited, Edinburgh, Scotland, a British company
Filed May 11, 1964, Ser. No. 366,523
Claims priority, application Great Britain, May 25, 1963, 20,964/63
6 Claims. (Cl. 260—486)

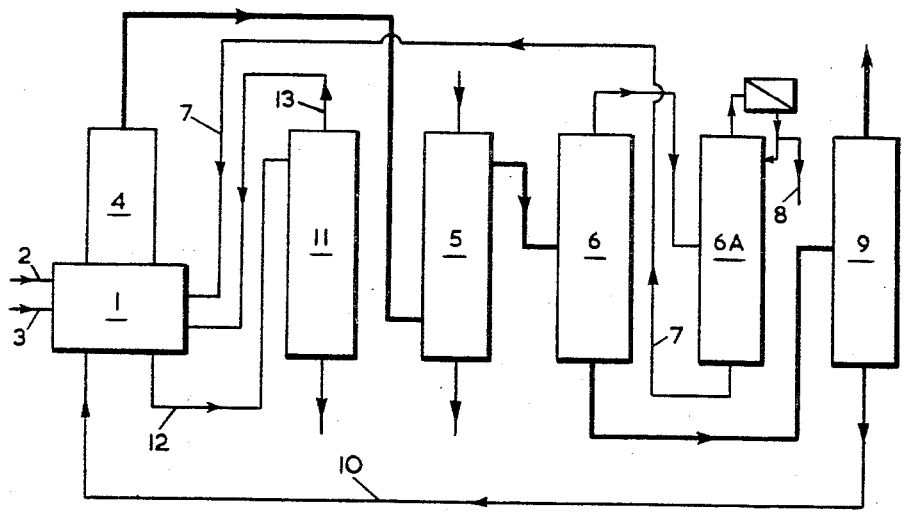

The present invention relates to the production of ethyl acrylate.

Our copending U.S. application Ser. No. 154,024, now abandoned, describes and claims a process for the production of ethyl acrylate which comprises continuously feeding a mixture containing acrylic acid, at least one mole of ethanol per mole of acrylic acid, and ethyl acetate as entrainer, into a reactor maintained at an elevated temperature, containing an acid catalyst, continuously distilling over a fraction containing ethyl acrylate, ethyl acetate and substantially all the water produced in the esterification or introduced with the feed, and controlling the concentration of polymeric material by continuous removal of a liquid stream from the reaction mixture.

It has now been discovered that the concentration of water in the esterification reaction mixture is critical. It has been found that if the concentration of water lies outside a critical range, the concentration of either the ethyl acrylate or the water will build-up in the reactor making it necessary to employ high temperatures for the removal, by distillation, of the products; the use of such high temperatures increases the production of unwanted polymers and other by-products. Apart from this, since the esterification is a reversible reaction the build-up of water or of ester in the reaction mixture suppresses the reaction.

It is an object of the present invention to maintain the resident water content of the reaction mixture within a critical range by regulation of the amount of ethyl acetate entrainer fed to the reactor in order to avoid the aforesaid disadvantages.

Accordingly the present invention relates to a process for the production of ethyl acrylate comprising feeding the ethyl acrylate and a mixture containing acrylate acid into a reactor maintained at an elevated temperature containing an acid catalyst continuously distilling overhead a fraction containing acidic ethyl acrylate and substantially all the water produced in the esterification and introduced with the feed, recovering from said overhead fraction ethyl acetate and recycling said ethyl acetate with the feed in such an amount as to maintain a concentration of water in the reaction mixture of between 8 and 12% by weight and controlling the concentration of polymeric material by continuous removal of a liquid stream from the reaction mixture.

The ethyl acetate entrainer may be recovered from the overhead fraction by any suitable method, e.g. extractive or azeotropic distillation. Preferably the ethyl acetate is recovered by extracting the overhead fraction with water to remove alcohol, and then separating the ethyl acetate from the ethyl acrylate, for example by fractional distillation. The ethyl acetate fraction may be finally purified and dried by a further distillation step in which ethyl acetate is removed as base product and low boiling point impurities such as diethyl ether and ethyl formate are removed overhead. The purified and dried ethyl acetate is then recycled in controlled amounts to the esterification reactor.

The ethyl acetate recycle to the esterification reactor is regulated to maintain a resident concentration of water in the reactor of between 8 and 12% by weight and preferably about 10% by weight.

The present improvement is illustrated in more detail with reference to the accompanying drawing which illustrates schematically in the form of a flow sheet part of a process for the production of ethyl acrylate.

Referring to the drawing an esterification reactor 1 containing sulphuric acid as an esterification catalyst is fed with separate streams of ethanol, acrylic acid, and recycled ethyl acetate through lines 2, 3 and 7 respectively. The reactor is suitably heated by steam and a vaporised mixture of unreacted acid, alcohol, water, esters and ester/water azeotrope together with by-product materials pass from the reactor to distillation column 4 where part of the vapour is condensed and the condensate returned to the reactor. The remainder of the vaporised mixture is removed from the head of the column and passed to a purification system comprising an extraction column 5, for the extraction of residual ethanol by countercurrent extraction with water, and a distillation column 6 for the topping of the resulting ethyl acrylate fraction to remove low boiling by-products and ethyl acetate. The overhead fraction from column 6 is passed to distillation column 6A for separation of ethyl acetate from the low boiling by-products such as diethyl ether and ethyl formate. Ethyl acetate is removed as a base product from column 6A and is returned in controlled amounts to the esterification reaction by line 7. The overhead fraction from column 6A is passed to a phase separator for removal of an aqueous fraction, the oil fraction being returned to column 6A as reflux. A bleed is provided by line 8 in order to prevent the build-up of low boiling by-products. The ethyl acrylate fraction removed as a base product from column 6 is passed to a final distillation column 9 for removal of high boiling point impurities as a base product and of pure ethyl acrylate overhead. High boiling point residues removed from the base of column 9 are recycled through line 10 to the esterification reactor. These impurities together with any high boiling or polymeric material introduced with the acid feed or made in the esterification reactor are removed from the system by a liquid bleed from the reactor and are passed to the head of a film evaporator 11 by line 12. Unreacted feed together with ethyl acrylate and ethyl acetate removed in the bleed stream are returned from the head of the evaporator to the reactor by line 13. Unwanted residues are finally removed from the system from the base of the evaporator.

The present improvement is illustrated with reference to the following example.

*Example*

The esterification reactor was operated continuously with feed and recycle streams substantially as described above. The recycle ethyl acetate stream was adjusted in such a way that for each mole of acid fed to the esterification reactor 1.0 mole of ester was recycled. After several hours of operation the water concentration in the esterification reactor fell to 4% the ethyl acrylate content increased to 33% and the reaction slowed down appreciably causing the reactor level to increase substantially above normal. The recycle of ester was then reduced to 0.4 mole per mole of acid and the water concentration in the esterification reactor began to rise. This was accompanied by a reduction in the reactor liquid level caused by faster reaction rate and faster removal of ethyl acrylate in the distillate at constant reaction temperature. When the water concentration in the reactor rose to between 9 and 10% and the ethyl acrylate content was reduced to about 20%, the recycle of ethyl acetate was increased and from then on controlled at such a rate as to maintain the water concentration in the reactor at about 9.5%. This proved to be an effective method of maintaining constant reaction conditions and especially constant reaction rate.

We claim:

1. A process for the production of ethyl acrylate which comprises continuously feeding ethyl acetate and a mixture containing acrylic acid and at least one mole of ethanol per mole of acrylic acid into a reactor maintained at an elevated temperature containing an acid catalyst, continuously distilling overhead a fraction containing acidic ethyl acrylate, ethyl acetate and substantially all the water produced in the esterification and introduced with the feed, recovering from said overhead fraction ethyl acetate and recycling said ethyl acetate with the feed in such an amount as to maintain a concentration of water in the reaction mixture of between 8 and 12% by weight and controlling the concentration of polymeric material by continued removal of a liquid stream from the reaction mixture.

2. A process as claimed in claim 1 wherein the ethyl acetate is recovered from the overhead fraction by extractive distillation.

3. A process as claimed in claim 1 wherein the ethyl acetate is recovered from the overhead fraction by azeotropic distillation.

4. A process as claimed in claim 1 wherein the ethyl acetate is recovered from the overhead fraction by extraction with water to remove alcohol, followed by separation of the ethyl acetate from the ethyl acrylate by fractional distillation.

5. A process as claimed in claim 4 wherein the ethyl acetate fraction is subjected to a further distillation before recycle in which the ethyl acetate is removed as a base product and low boiling point impurities are separated as an overhead fraction.

6. A process as claimed in claim 1 wherein the amount of ethyl acetate recycled with the feed is such as to maintain a resident concentration of water in the esterification reactor of about 10% by weight.

References Cited

UNITED STATES PATENTS

| 1,998,413 | 4/1935 | Reppe et al. | 260—486 |
| 2,333,756 | 11/1943 | Wentworth | 260—541 |
| 2,649,475 | 8/1953 | Bellringer et al. | 260—486 |
| 2,987,542 | 6/1961 | Modiano | 260—486 |
| 3,006,950 | 10/1961 | Weiss et al. | 260—486 |
| 3,264,347 | 8/1966 | Sennewald et al. | 260—486 X |

LORRAINE A. WEINBERGER, *Primary Examiner.*

A. HALLUIN, *Assistant Examiner.*